Oct. 10, 1961     E. LAIMINS     3,004,231

PARALLELOGRAM BEAM TYPE LOAD CELL

Filed Feb. 15, 1960

INVENTOR
Eric Laimins
BY
Attorney

United States Patent Office 3,004,231
Patented Oct. 10, 1961

3,004,231
PARALLELOGRAM BEAM TYPE LOAD CELL
Eric Laimins, Cambridge, Mass., assignor to Baldwin-Lima-Hamilton Corporation, a corporation of Pennsylvania
Filed Feb. 15, 1960, Ser. No. 8,825
6 Claims. (Cl. 338—5)

This invention relates to force measuring devices of the parallel beam type and more particularly to those employing electrical strain sensing means for measuring strain induced in a beam member by an applied load to be measured.

Various types and arrangements of such load responsive devices have heretofore been proposed and used, and while many of these devices have produced extraordinary results as to linearity of electrical output vs. load, low hysteresis, and others, yet their construction has been such as to introduce problems in manufacturing and in mounting the parallel beam elements on a supporting structure. For example, it is customary to have the corresponding ends of the parallel beams connected together by relatively heavy cross members and in the assembling of the device one of these members is clamped or otherwise suitably secured to a supporting structure, the load being applied to the other end of the beams through the heavy cross member connecting these ends which are free to move. The electrical strain gages are mounted on one or more of the beams near the juncture of the cross support which is clamped to the supporting structure. It has been found that the strain sensing means, due to their proximity to the clamping action, have been very sensitive to such clamping action thereby making it difficult to obtain precision qualities of the device.

It is an object of my invention to provide an improved parallel beam type of load responsive device of the strain sensing type that eliminates the possibility of adverse assembling conditions, while at the same time providing a device that has a high degree of versatility in selectively meeting various operating conditions such as linearity, low hysteresis, and effects of side loads, torsional loads, etc.

A further object is to provide an improved parallel beam type load responsive device, employing electrical type strain gages, that is not only relatively simple and economical to manufacture but also has a high degree of ruggedness and compactness for a given load capacity without sacrificing desirable precision and functional qualities.

Other objects and advantages will be more apparent to those skilled in the art from the following description of the accompanying drawings in which.

Figure 5:
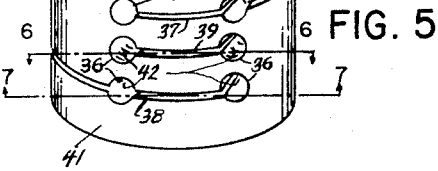
Figures 6, 7:
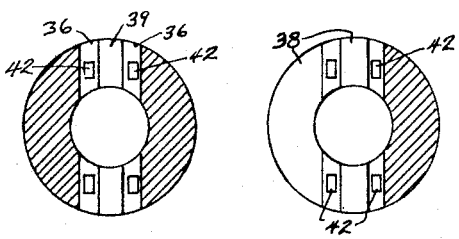

FIG. 5 is a perspective of my improved device in the form of a cylindrical column; and FIGS. 6 and 7 are cross-sectional views taken on lines 6—6 and 7—7 respectively of FIG. 5.

Figure 1:
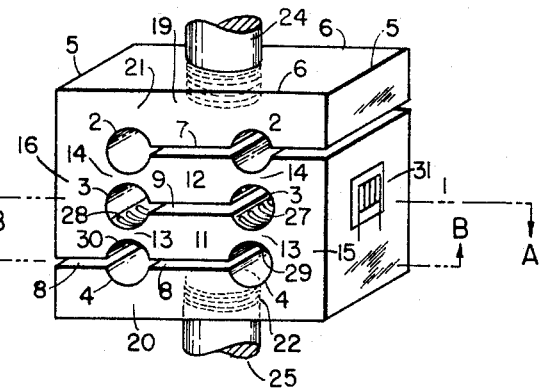
FIG. 1 is a perspective of my improved device.

In the particular embodiment of my invention disclosed herein for purposes of illustration I provide preferably a single solid block 1 of any well-known strain responsive material suitable for carrying a desired load. Two sets of parallel circular holes 2, 3 and 4 are drilled across the depth of the block. The sets of holes are preferably equidistance from each other, and the individual holes in each set are also preferably equi-distance although such spacing may vary depending upon the desired degree of strain concentration at a point where strain measurements are to be taken. It is to be understood that the block is preferably of rectangular shape as shown in FIG. 1 with the end dimension 5 preferably, but not necessarily, shorter than the front and back dimensions 6. These relative dimensions will, of course, vary in accordance with the load capacity of the device but in all instances the axes of the holes 2–4 are preferably parallel with both the top and end surfaces of the devices. A cut 7 is then made from one end of the block so as to preferably intersect the axes of the holes 2 and a similar cut 8 is made from the other end of the block so as to intersect the axes of holes 4. A cut 9 is also made to connect the holes 3.

These series of cuts thus produce rigid sections 11 and 12 connected at their ends with relatively narrow flexure sections 13, 14 which in turn are connected by heavy relatively inflexible end sections 15 and 16. The cuts also create upper and lower oppositely extending, relatively inflexible, cantilever load transmitting members 19 and 20 connected respectively to the solid end sections 16 and 15. The cantilever load transmitting members extend in opposite directions toward each other from their respective ends 15 and 16 so that the beams and cantilevers all lie in a superimposed relation. Flexure action occurs between the cantilever members 19 and 20 and their respective solid sections by reason of the narrow areas 21 and 22 which may be varied if necessary. Load is transmitted to the cantilever members 19 and 20 through upper and lower substantially axially aligned rods 24 and 25 threadedly or otherwise secured in such members, thus providing a simple and rugged structure for introducing load into the device. It will be noted that neither end section 15 or 16 is connected to a supporting structure as heretofore has been the practice. The device is supported solely through the load transmitting rods 24 and 25 thereby allowing the parallel beams 11 and 12 to be free of distortion from usual clamping effects. The load transmitting cantilevers, by being placed above and below the beams 11 and 12, allow the entire device to float as a unit in response to an applied force thereby minimizing adverse external effects. It will be understood that the terms "above" and "below" are merely relative with respect to the device which may be placed in vertical, horizontal, or any other position. Reference herein to the block having "top," "bottom," and "end" surfaces are also relative terms.

Strain gages of the well-known bonded electrical resistance filament type are disposed preferably in the adjacent surfaces of the holes 3 and 4 in each set of holes as indicated at 27, 28, 29 and 30, provided flexure portions 13 are made larger in thickness than flexures 14. The active portion of each gage filament extends preferably in a circumferential direction in the holes. A gage 31 is placed on one end or the other of the solid ends 15, 16 so as to be free of any noticeable strain. This gage can thus be used to compensate for changes in modulus of elasticity of the material of the block 1 with changes of temperature, provided it is placed in the power lead of the bridge circuit.

Figure 3:
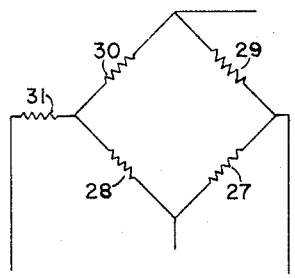
FIG. 3 shows the circuitry in bridge form.
Figure 2:
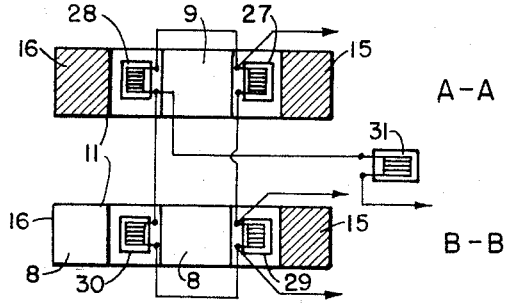
FIG. 2 is a diagrammatic envelope of the strain sensitive portions of my device to show the circuitry of the gages taken generally on the lines A—A and B—B of FIG. 1.

The gages are connected in a circuit as shown in FIG. 2 which appears in FIG. 3 as a Wheatstone bridge, the gages 27 and 30 being of like sign say, for tension, and gages 28 and 29 being of like sign say, for compression, or vice versa depending upon the direction of flexure of the device in response to whether the applied load is tension or compression.

From the foregoing disclosure it is seen that the members 11 and 12 function as a pair of parallel beams connected rigidly into common rigid ends 15 and 16 through the flexure portions 13 and 14. The members 11 and 12 in themselves are relatively rigid. Hence these members, together with their rigid ends 15 and 16 are a paralellogram whose ends 15 and 16 are caused to move vertically, relatively, when load is applied between members 24, 25. The manner of transmitting the load forces to the end portions 15 and 16 through the cantilevers 19 and 20 and their flexural sections 21 and 22 has been found to produce an extremely high degree of linearity of gage output vs. load. The load, as thus transmitted to the beam 11, seems to allow a very true strain to be induced at the gage areas in proportion to load. In this arrangement it is seen that beam 11 is a strain responsive beam while beam 12 functions as a flexure plate to maintain the end portions 15 and 16 parallel to each other during their relative vertical movement. In addition to the improved linearity and other desirable functional characteristics of this force measuring device, I have accomplished these results in a device that is extraordinarily simple in its construction and method of manufacture combined with a very high degree of ruggedness and compactness.

The flexure areas 21 and 22 permit the upper and lower cantilever members 19 and 20 to maintain a controlled loading of flexure portions 13 and 14 during compression, or extension (under tension), of the device thereby minimizing the possibility of introducing distortions into the strain sensitive areas where the gages are located. In any event, whether this theory of operation is correct or not, the fact is that I have found my device to be capable of having extreme linearity and low hysteresis in addition to compactness, simplicity, and ruggedness.

Figure 4:
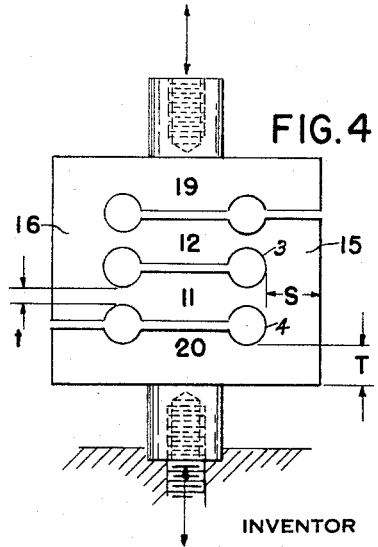
FIG. 4 is a side elevation of my device to show certain proportions of parts.

Certain portions of the device all have some effect upon the performance thereof when subjected to load. For instance, in FIG. 4 these portions can have the ratio of the dimensions $T/S$; $T/t$; and $S/t$. For good linearity and hysteresis $T/t$ and $S/t$ are greater than 1. For example excellent results have been obtained with $S/t$ equal to 40:1 and $T/t$ equal to 20:1. If it is necessary to obtain a high degree of isolation of the strain gage areas from the effects of side loads, torsional loads, etc. then $T/t$ should be greater than 1 but less than 20:1. While this will impair the linearity and hysteresis characteristics yet it merely shows the versatility of my improved construction in being able to meet various special conditions of operation.

All of the advantages and principles of operation of the rectangular form of device shown in FIGS. 1 to 3 can also be obtained in other forms. For example, a tubular body of square, round, or other suitable cross sectionable shape or solid cylinders may be employed. One form shown herein for purposes of illustration is a cylindrical tube having transverse holes 36 and upper and lower slots 37 and 38 and an intermediate slot 39 similar in every respect to the rectangular forms of FIGS. 1 to 3 except that the holes intersect the bore of the tube and extend to the full diameter thereof while the cantilever members 40 and 41 extend circumferentially for the full diameter of the tube. There is thus one set of beams on one side of the tube and another set on the other side, the two sets being operated simultaneously by the two cantilever members 40 and 41 which are common to the two sets. Gages 42 are mounted in the surfaces of the holes corresponding to those gaged holes in the rectangular form of the device but with the additional feature of preferably having such holes gaged on each of the opposite sides of the tube. The gages on the parallel beams at one side of the tube can be connected in a bridge similar to FIG. 3 and also the gages on the parallel beams on the other side of the tube can be connected in a similar bridge of its own. The two bridges can be connected together, or connected in any one of many other arrangements well known in the art such as having corresponding gages on each set of beams connected in series in the same arm of the bridge. The slots and holes create parallel beams, cantilever members, rigid end sections and flexure sections similar to the rectangular arrangement of FIG. 1. The tubular structure not only provides two sets of parallel beams, one on each side of the tube, by reason of all holes 36 intersecting the tube bore, but also allows the tube at each end to be easily internally threaded as at 43 along its axis to receive axially aligned load transmitting rods.

It will, of course, be understood that various changes in details of construction and arrangement of parts may be made by those skilled in the art without departing from the spirit of the invention as set forth in the appended claims.

I claim:

1. A force measuring device comprising, in combination, a pair of substantially parallel beams having flexure elements at each end thereof, rigid sections at both ends of said beams, the flexure elements at one of the corresponding ends of the beams being connected to one of said rigid sections and the flexure elements at the other corresponding ends of the beams being connected to the other rigid section, load transmitting cantilever members positioned above and below said beams and connected respectively to said rigid sections so that the beams and cantilever members are in substantially superimposed relation whereby a load force to be measured is applied to each of said cantilevers substantially normal to the direction of the superimposed relation, and strain responsive means for sensing strains induced in one of said beams upon application of load to the cantilevers.

2. The combination set forth in claim 1 further characterized in that the cantilever members have flexure elements through which the cantilevers are connected to the rigid sections, and the strain sensing means comprises electrical strain sensitive filaments bonded to the flexure elements of the beam.

3. A force measuring device comprising, in combination, an integral block having end surfaces and top and bottom surfaces, a pair of holes located toward the top surface and with their axes substantially parallel to each other and spaced inwardly from said end surfaces to provide rigid end sections, a slot extending from one end of the block and intersecting the first hole but terminating at the second hole and lying in a plane substantially parallel to the axes of said holes, a similar set of holes and slot located toward the lower surface of said block but with the slot extending from the other end thereof, and a third set of similar holes located between the upper and lower holes but connected by a slot that terminates at each hole of the third set, whereby two load transmitting cantilever members are formed at the top and bottom of the block extending in opposite directions from the rigid sections and two intermediate beams are provided to form a parallelogram, and bonded filament type strain gages located on hole surfaces at the ends of one of the parallelogram beams so as to be responsive to strains induced therein upon application of load to the cantilever members in a direction substantially normal to the plane of said cuts.

4. The combination set forth in claim 3 further characterized in that the integral block is a tubular member whose axis extends substantially normal to the parallel beams, flexure elements and load transmitting cantilever members are all formed in the tubular body, the parallel beams extending from the opposite outer sides of the tube wall to the inner sides thereof and the cantilever members extending circumferentially from one side of the tube to the other side thereof.

5. A force measuring device comprising, in combination, a tubular member having provision for transmitting load substantially axially thereto, said tube having a pair of holes located toward one end of the tube and another pair of holes located toward the other end of the tube and a third pair of holes located between said other pairs of holes, all of said holes being substantially parallel to each other and having their axes lie in planes that are normal to the tubular axis, a slot extending from one side of the tube and intersecting the first pair of holes but terminating at the second of such holes and lying in a plane substantially parallel to the axes of said holes thereby to provide a cantilever load transmitting member, the tubular member having a similar slot intersecting the pair of holes near the other end of the tube but with the slot extending from the other side of the tube thereby to provide another load transmitting cantilever member extending in an opposite direction to the first cantilever member, and a third slot intersecting the intermediate holes and terminating in each of the same thereby to provide two substantially parallel beams, all of said holes being spaced inwardly so as to provide rigid end sections connecting together each of the corresponding ends of the parallel beams to form a parallelogram and to connect one end of one of the cantilever beams to one of said rigid sections and to connect an opposite end of the other cantilever beam to the other rigid section, and strain responsive means secured to hole surfaces at the ends of the parallel beams so as to be responsive to strain induced therein upon application of load to the cantilever members in a direction substantially normal to the plane of said slots.

6. The combination set forth in claim 5 further characterized in that the opposite ends of the tube bore are internally threaded to receive load transmitting elements.

References Cited in the file of this patent

UNITED STATES PATENTS

| | | |
|---|---|---|
| 2,796,503 | Ward | June 18, 1957 |
| 2,855,779 | Zaid | Oct. 14, 1958 |